Figure 1:
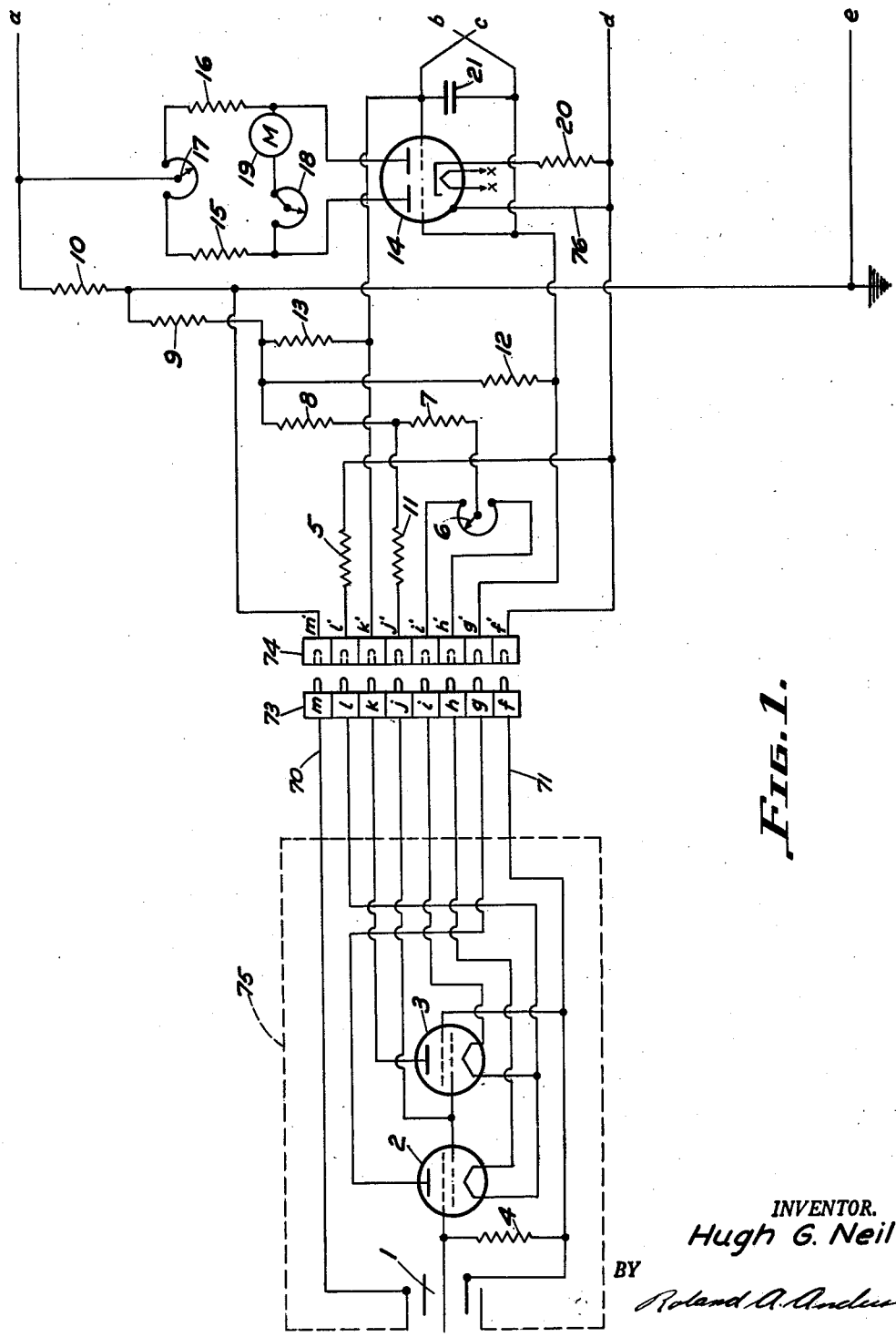

July 4, 1950     H. G. NEIL     2,514,135
RADIATION DETECTOR
Filed March 4, 1949     2 Sheets-Sheet 1

INVENTOR.
Hugh G. Neil
BY
ATTORNEY

July 4, 1950 H. G. NEIL 2,514,135
RADIATION DETECTOR
Filed March 4, 1949 2 Sheets-Sheet 2

INVENTOR.
Hugh G. Neil
BY
Roland A. Anderson
ATTORNEY

Patented July 4, 1950

2,514,135

UNITED STATES PATENT OFFICE 2,514,135

RADIATION DETECTOR

Hugh G. Neil, Knoxville, Tenn., assignor, by mesne assignments, to the United States of America as represented by the United States Atomic Energy Commission Application March 4, 1949, Serial No. 79,681

11 Claims. (Cl. 250—83.6)

My invention relates to systems for detecting radiation and more particularly to a system responsive to radiation for producing an audible note which distinguishes intensity and frequency.

When working with or near radioactive materials, or when in a contaminated area, some means is needed for indicating or measuring the radiation present in any one place so that nearby personnel will not be exposed to dangerous or excessive amounts. In addition, in the inspection of parts or equipment prior to or after cleaning it is necessary to determine the existence or extent of contamination.

In the prior art, area surveys have generally been carried out by radiation meters or counting devices, and in parts or equipment inspection pluro-survey instruments have often been employed to detect surface contamination. In general no audible indication is given by these systems of the prior art, and apparently these known systems do not contemplate measurement of both magnitude and frequency with a single indicator. Bulkiness and weight make it difficult to move the equipment from point to point, and the use of visual indication limits the speed of inspection and the adaptability of such equipment. In addition, to obtain the proper stability the voltage output of such a circuit or circuits should be maintained at a maximum, but the capacitance of the input circuit is usually high, and this necessitates a relatively large resistor for the desired voltage drop. However, the employment of a large resistor makes the circuit slow in response, and increases the difficulty in locating points or limited areas of contamination when progressively surveying an area of considerable size.

Applicant with a knowledge of these problems in the prior art has for an object of his invention the provision of a system for detecting both the intensity of radiation and the frequency or rate of change of intensity.

Applicant has another object of his invention the provision of a system for detecting radiation and giving audible indication thereof, making it possible to survey large areas without continuous observation of meter indication.

Applicant has as another object of his invention the provision of a radiation detecting system which produces audible indication of both radiation intensity and changes therein, thereby making the indications available to a number of listeners who may be scattered over an appreciable area and/or located at different positions.

Applicant has as a further object of his invention the provision of an audible radiation detecting system responsive to both radiation magnitude and changes therein, thereby permitting the use of light mobile probes which may be moved over considerable areas while the remainder of the system may remain stationary, thus reducing the weight of the equipment that need be transported in the survey operation and increasing the speed of performance.

Other objects and advantages of my invention will appear from the specification and the accompanying drawings, and the novel features thereof will be particularly pointed out in the annexed claims.

Figure 2:
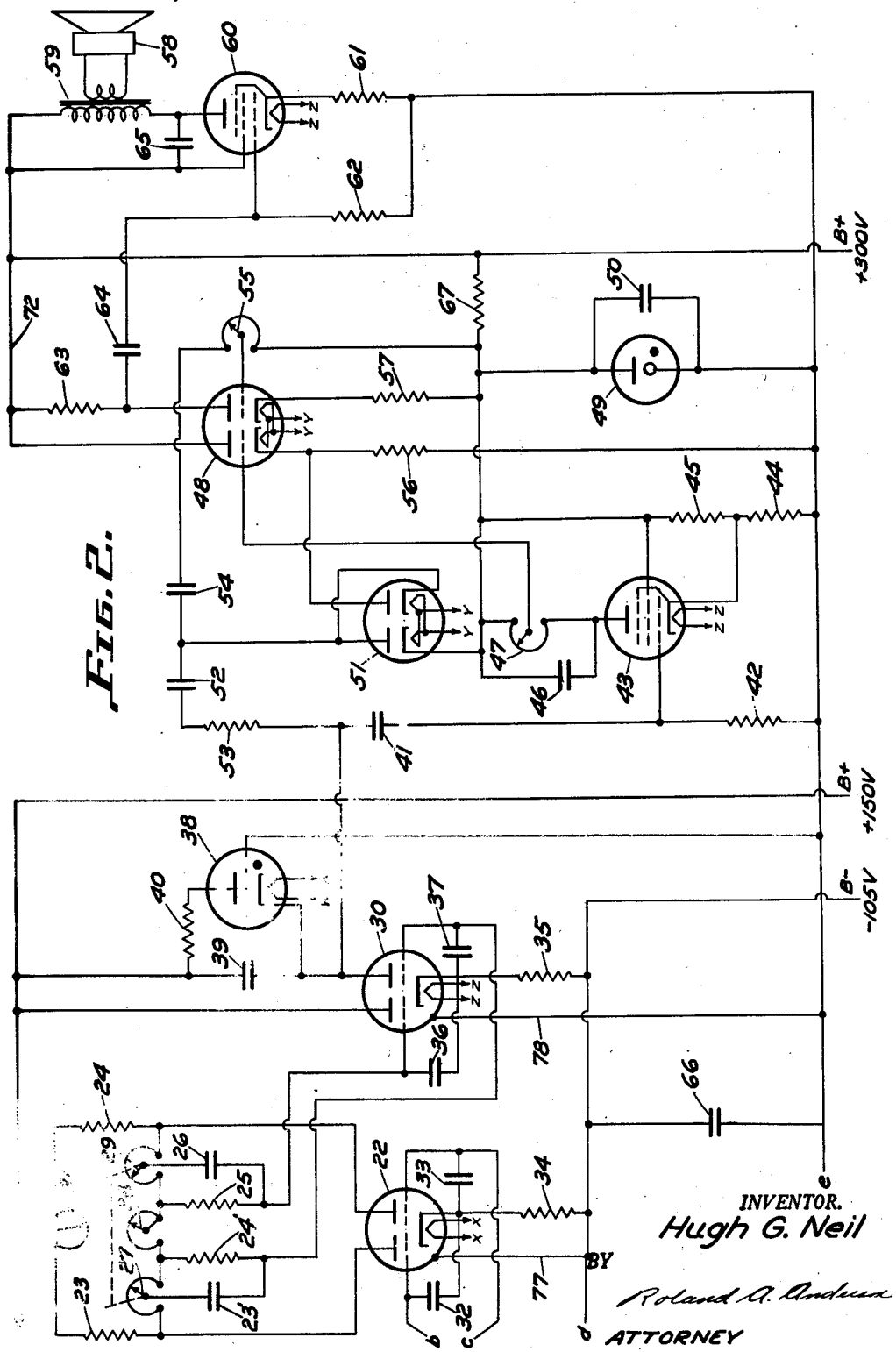

In the drawings, Fig. 1 is a schematic of an electrometer circuit or stage for coupling to a measuring circuit employed in my improved radiation detector system. Fig. 2 is a schematic of the oscillator, attenuator and amplifier stages of my improved radiation detector system.

Referring to the drawings in detail, disclosing a preferred embodiment of my improved system, particularly adapted for alpha radiation detection, 1 designates an ionization chamber, preferably in the form of a probe, which feeds the inputs of tubes 2 and 3, preferably of tetrode construction, connected in push pull relation. The probe 1 may be similar to that disclosed in the prior copending application of Borkowski, Serial No. 748,433, or it may take any other suitable form. In the conventional form shown the outer shell of the electrometer is electrically connected to the case 75 which houses the tubes 2, 3 and is fed through a lead 70 to ground. The guard ring is connected through lead 71 to B(—). The center wire potential is determined by the drop across resistor 4, and when ionization occurs in the chamber the positive ions drift towards the center wire. Electron flow through the resistor produces a voltage drop thereacross. In this arrangement, the tubes 2, 3 may be fed through their suppressor grids rather than their control grids. This is done to minimize grid current changes due to the effect of positive ions about the cathode, since the currents from the ionization chamber are of very low magnitude. Bridged across the input circuits to the discharge devices 2, 3 is the load resistor 4 to provide the voltage drop therein. One side of the heated filaments of tubes 2, 3 is preferably led through resistor 5 to B(—), which is preferably maintained at about —105 volts, while the other side of each of the filaments of the tubes is connected to B(+), preferably maintained at +150 volts, through potentiometer 6 and resistors 7, 8, 9 and 10. Likewise the control grids of these tubes are tied together and coupled to B(+) through resistors 11, 8, 9 and 10. The anodes or plates of these tubes are fed from B(+) through resistors 12, 13. In this arrangement the potentiometer 6 is employed to control the ratio of the two filament currents and to serve as a course zero, since the filament characteristics of the tubes may vary over a wide range. The above elements associated with or included in the case 75 are, for convenience, connected through the conventional plug 73, 74 to the remainder of the circuit. The plug carries a series of pronged sectors *f, g, h, i, j, k, l,* and *m* which seat in mating socket sectors *f', g', h', i', j', k', l'* and *m'* to provide electrical continuity.

In the above push pull arrangement of tubes 2, 3 the output thereof is proportional to the amount of radiation present. This push pull output is preferably applied to the control grids of a common cathode duo-triode 14, preferably of the 6SC7 type, although any suitable type or types of tubes may be employed. The plates thereof may then be connected to B(+) through load resistors 15, 16 and balancing potentiometer 17. Bridging the plates of tube 14 is an adjustable resistor 18 and meter 19, connected in series. A common cathode resistor 20 in the circuit from cathode to B(—) serves to provide bias for the tube, and a stabilizing condenser 21 bridges the control grids of tube 14 for by passing high frequency disturbances such as those caused by microphonics of the probe. Lead 76 connects the shield of tube 14, where a metal tube is employed, to B(—) through lead 76 to reduce the possibility of picking up stray A. C. currents or noise.

In addition the outputs of tubes 2, 3 of the push pull amplifier are fed to the control grids of double tube 22 which may take the form of a duo-triode, preferably of the 6SC7 type but may be any other type or types suitable for the purpose. The plates of the triodes of tube 22 are connected to B(+) through load resistors 23, 24 and balancing potentiometer 31. The outputs of these triodes are coupled through R. C. networks 23', 24' and 25, 26 to the control grids of amplifiers which may be in the form of a duo-triode 30. The R. C. networks are themselves coupled to each other through variable resistor 28, and the components of each R. C. network are joined through potentiometers 27 and 29 to facilitate adjustment for altering the action and characteristics of the networks. Stabilizing condensers 32, 33 bridge the cathode and control grids of tube 22 to by pass high frequency microphonics and to eliminate A. C. pick up in the D. C. amplifiers, and a common cathode resistor 34 couples the triodes to B(—). The shield of tube 22, if it be a metal tube, may be connected to B(—) through lead 77, as in the case of tube 14 to reduce noise and prevent pick up of stray A. C.

Use of the parallel R. C. networks 23', 24' and 25, 26 in the output circuits of tube 22 causes the circuits to discriminate in favor of the higher frequencies and against passage of the lower frequencies, that is, output is greater for fast changes in input voltages than for slow changes or for D. C. This circuit including tube 22 may be called an "anticipator" and the output may be thought of as involving two components, one of which is proportional to the amount of radiation and the other of which is proportional to the rate of change of radiation.

With the push pull output of the "anticipator" applied to the grids of the duo-triode 30, the common cathode thereof is coupled to B(—) through resistor 35. Stabilizing condensers 36, 37 bridge the control grids of the triodes of tube 30 and their common cathode for by pass purposes to eliminate A. C. pick up. The plate of the first triode of tube 30 is connected directly to B(+) while the plate of the second triode is connected to B(+) through a gas tube 38, preferably of the triode type, and its load resistor 40 and the capacitor 39 which is in parallel therewith. It may thus be seen that with the common cathode resistor 35, tube 30 acts as a cathode follower during the period when the first triode is conducting, and as a conventional amplifier during the period when the second triode is conducting. Tube 30 is preferably of the 6SC7 type with its metal shield connected to ground through lead 78.

The circuit including gas tube 38, condenser 39, and duo-triode 30 functions as a relaxation oscillator with condenser 39 acting as the charging capacitor, duo-triode tube 30 acting as charging resistor for the capacitor, and gas triode 38 as the discharge tube. The frequency of the oscillator is determined by the value of the charging resistor which is in turn controlled by the output of the "anticipator." Therefore, the greater the output the higher the oscillator frequency will be.

The oscillator output is coupled through a differentiator, which includes condenser 41 and resistor 42, to the input of tube 43, preferably of pentode type. The cathode is connected through the resistor 44 to ground. Resistor 45 bridges the cathode and screen grid of the tube, and the plate thereof is coupled to a source of positive potential of preferably 150 volts by condenser 46 and potentiometer 47. The moving contact of potentiometer 47 feeds the control grid of the first section of tube 48, which is preferably of duo-triode construction, and acts as a cathode follower. To maintain the potential, a voltage regulator tube 49 is bridged across the leads to the cathode-anode circuit of tube 43, and condenser 50 serves to filter out rapid changes in voltage in the circuit. It will be seen then that with the differentiator 41, 42 in the input circuit, the amount of current drawn by tube 43 will be proportional to the frequency.

The output of the oscillator 38 is also applied to the first plate and second cathode of tube 51, which is preferably of duo-diode type, through a capacitor 52 and resistor 53. The first cathode of tube 51 is connected to the positive potential source of preferably 150 volts, and the second plate is connected to the output of the cathode follower or first section of tube 48.

The output of the oscillator 38 passing through resistor 53 and condenser 52 is also fed through capacitor 54 and potentiometer 55 to the positive potential source of preferably 150 volts. The moving arm of the potentiometer 55 is then connected to the control grid of the second section of tube 48 so that the bias thereon may be adjusted accordingly. Cathode resistors 56, 57 are interposed in the cathode circuits of the first and second sections, respectively, of tube 48. The output of the first section of tube 48 is connected directly from the anode to a high potential B(+) source of about 300 volts, and the output of the second section is connected from the anode through a resistor 63 to this high potential B(+) lead 72. The output of the second section of tube 48 also feeds into the control grid of amplifier 60, which is preferably of pentode type, through conventional resistance-capacitance coupling 62, 64. The cathode of tube 60 is connected to ground through resistor 61, and the output of the amplifier 60 feeds a sound reproducing device 58, such as a loud speaker, which is coupled thereto through a transformer having its primary interposed between the plate of tube 60 and the high potential B(+) lead 72. The screen grid element of tube 60 is tied to high potential B(+)

lead 72 and condenser 65 serves to bridge the plate and screen grid of the tube.

In the above arrangement the circuit including tubes 43 and 51, and the first section of tube 48, acts as an attenuator for the signal from the oscillator 38 to the second section of tube 48. While the lower frequencies are greatly attenuated the higher ones suffer comparatively little attenuation. This tends to greatly accentuate the high frequencies at the expense of the lower one. It is seen that at times of low oscillator frequency tube 51, bridged across the input of the second section of tube 48, will by pass most of the oscillator signal, and little will appear at the control grid of the second half of tube 48. This is apparent since at low frequencies tube 43 is almost non-conducting, maintaining the potential on the control grid of the cathode follower or first section of tube 48 at a relatively high level which results in continued conduction. The voltage on the first cathode of tube 51 is about 150 volts while on the second plate of this tube the operation of the cathode follower section of tube 48 will pull the voltage up a few volts positive with respect to the first cathode of tube 51. As the second cathode and first plate of tube 51 are tied together and are floating, that tube will conduct over almost all the entire A. C. cycle tending to short circuit or greatly attenuate the low frequency signal. However, when the frequency of the oscillator increases the differentiator 42 produces sharp differentiations, and the circuit including tube 43, acts as a rate meter circuit with conduction across the tube 43 increasing, and the voltage at the plate decreasing. This lowers the potential of the control grid of the cathode follower section of tube 48, and decreases the flow of current across the tube; and this in turn decreases the voltage drop across resistor 56 and lowers the potential at the second plate of tube 51. The potential at the second plate relative to that of the first cathode of tube 51 causes the tube to conduct over a smaller portion of the A. C. cycle, increasing the A. C. impedance in the grid circuit of the second section of tube 48 and producing less attenuation of the A. C. signal, causing a greater resulting signal to appear at its grid. This is translated to the speaker 58 through the second section of tube 48 and amplifier 60.

Considering the operation of the system more in detail, radiation within the range of the instrument ionizes the gas or gases of the ionization chamber 1 and charges are collected on the electrodes thereof. These charges are then impressed upon and/or amplified by the push pull amplifier 2, 3 whose output in turn is fed to the duo-triode tube 14 which acts as a transconductance stage with its output connected to meter 19, preferably of the 100 microammeter type. In this way indication of the meter 19 serves as a measure of the intensity of radiation and may be utilized by the operator for close measurement of any desired point or area. The signal from the push pull amplifier 2, 3 is also impressed upon tube 22 and is amplified, but due to the "anticipator" action of the R. C. networks 23', 24', and 25, 26, the A. C. response is much more sensitive than the D. C. response. This output is then fed to the amplifiers 30 to alter their conductance. As the conduction increases therein currents from condenser 39 leak off, or a negative charge is built up on the lower plate of the condenser by reason of the flow of electrons across the space from cathode to plate of the second section of tube 30. As the lower plate of condenser 39 becomes more negative, this draws a positive charge from B(+) to the upper plate, and as the charge thereon increases the threshold voltage of the gas discharge tube 38 is reached, causing it to fire. Accordingly, as the frequency of radiation, that is, rate of change, increases, the output of the "anticipator" increases, and this in turn controls the conduction of tube 30 and the frequency of the firing of discharge tube 38. The output of the relaxation oscillator is then fed through capacitors 52, 54 to the amplifier of the second section of tube 48, and through the control circuits of tubes 43, 48 and 51, as heretofore described for attenuating the signal in accordance with frequency magnitude.

It will be seen then that when a relatively small constant amount of radiation is present the oscillator frequency will be comparatively low and the amplitude of the signal at the amplifier 48 will be small. The output of the speaker will then be a low volume and low pitched note. The reverse will be true when there is a relatively large constant amount of radiation, and the speaker will produce a low high-pitched note. Due to the action of the "anticipator," however, should the intensity of radiation be small but rapidly increasing, a high volume high-pitched note will be produced. Conversely, if the intensity of radiation is high but rapidly decreasing, a low volume, low-pitched note will result.

The desirability of the above-noted effect of rapid change in intensity can readily be seen in terms of the use of the equipment. The apparatus is particularly useful as a radiation survey device. If the meter reading is to be an accurate and stable indication of the intensity of radiation, it must necessarily have a relatively long time constant. Thus, if the device is employed to rapidly survey a large area having only a very small local "hot" region, the meter reading would integrate the intensity of radiation over the whole area, and quite possibly a dangerously high intensity level would not be indicated. However, due to the action of the "anticipator" a loud high-pitched note is produced as the device is swept past the local "hot" spot. The operator is thus apprised of the existence of such a spot, and he can concentrate the device on that region for a sufficient length of time to permit the meter to provide an accurate indication of intensity of radiation in the "hot" region.

In addition to the foregoing it may be pointed out that there are certain miscellaneous elements which enter into the operation of the system. For example, resistor 67 supplies current to VR tube 49 and keeps it lit. In this arrangement it serves as a bleeder resistor to provide the desired potential for tubes 43, 51 from the 300 volt B(+) source. Condenser 66 is inserted in the circuit to ground to stabilize the polarizing voltage for the probe or chamber 1, and to keep A. C. signal out of the amplifiers.

It will be noted that the connections for the heater elements of tubes 14, 22, 30, 51, 48, 43, and 60 are broken and designated $x$, $x$; $y$, $y$ or $z$, $z$. This is to signify that they are connected to like points on the heater windings of the usual power transformer (not shown). Since these circuits are conventional and were known in the art they have been omitted for purposes of convenience and ease of disclosure.

Having thus described my invention, I claim:

1. A system of the character described for detecting radiation comprising means responsive to the radiation for producing electrical impulses corresponding in magnitude and configuration to the radiation, a circuit fed by the radiation responsive means for producing signals which discriminate in favor of the higher frequencies, means for amplifying and reproducing the signals, and an attenuator responsive to the signals for offering progressively greater attenuation to the lower frequencies.

2. A system of the character described for detecting radiation comprising means for converting radiation into electrical impulses whose magnitude and configuration correspond to the radiation, an anticipator fed by the radiation responsive means for discriminating in favor of the impulses of higher frequency, means coupled to the anticipator for producing signals corresponding to the frequency and magnitude of said impulses, means for amplifying and converting said signals to sound, and an attenuator for providing progressively greater attenuation for the lower frequencies.

3. A system of the character described for detecting radiation comprising means for converting the radiation into a series of electrical impulses corresponding in magnitude and shape to the radiation, an anticipator fed by the radiation converting means for discriminating against the impulses of lower frequency, means for converting the impulses into signals having a frequency dependent upon the frequency and magnitude of said impulses, means for reproducing the signals, and an attenuator for offering progressively greater attenuation to the lower frequencies.

4. A system of the character described for detecting radiation comprising means for converting the radiation into a series of impulses of magnitude and configuration corresponding to the radiation, an anticipator fed by the converting means for discriminating against the impulses of lower frequency, means responsive to the action of the anticipator for producing signals of frequency depending upon the frequency and magnitude of the impulses, means for reproducing the signals, and an attenuator responsive to the signals for offering progressively greater attenuation to the lower frequencies.

5. A system of the character described for detecting radiation comprising means for converting radiations into a series of electrical impulses whose configuration and magnitude correspond to the radiations, an anticipator fed by the converting means for discriminating against the impulses of lower frequency, means coupled to the anticipator for producing signals with a frequency dependent upon the frequency and magnitude of the impulses, means for amplifying and reproducing the signals, and an attenuator responsive to signals for offering progressively greater attenuation of the lower frequencies.

6. A system of the character described for detecting radiation comprising means for converting radiations into a series of electrical impulses whose configuration and magnitude correspond to said radiations, an anticipator fed by said first means for discriminating against the impulses of lower frequency, means coupled to the anticipator for converting the impulses into signals with a frequency which is dependent upon the frequency and magnitude of said impulses, means for amplifying said signals, reproducing means fed by said amplifying means, and an attenuator interposed between the converting means and the amplifying means and responsive to said signals for offering progressively greater attenuation to the signals of lower frequency.

7. A system of the character described for detecting radiation comprising means responsive to radiation for converting it into electrical currents whose magnitude corresponds to the radiation, means fed by the converting means for discriminating against the pulses of lower frequency, an oscillator controlled by the discriminating means for producing signals which are dependent upon the frequency and magnitude of said pulses, means for reproducing the signals, and an attenuator for attenuating them.

8. A system of the character described for detecting radiations comprising means responsive to radiations for converting them into currents whose magnitude corresponds to the radiations, an anticipator for discriminating against the impulses of lower frequency, an oscillator controlled by the anticipator for producing signals of variable frequency, means for amplifying and reproducing the signals, and an attenuator interposed between the oscillator and amplifying and reproducing means for attenuating the signals.

9. A system of the character described for detecting radiation comprising means for converting radiation into currents whose magnitude corresponds to the radiation, means for discriminating against the impulses of lower frequency, an oscillator fed by said discriminator for producing signals controlled by the frequency and magnitude of said impulses, amplifying and reproducing means coupled to said oscillator, and an attenuator responsive to said signals for introducing a variable attenuation in the system.

10. A system of the character described for detecting radiation comprising means for converting radiation into currents whose magnitude is dependent upon the radiation, means for discriminating against the impulses of lower frequency, an oscillator fed by the discriminating means for producing signals whose frequency corresponds to the frequency and magnitude of said impulses, amplifying and reproducing means coupled to the oscillator, and an attenuator interposed between the oscillator and amplifying and reproducing and responsive to said signals for providing progressively greater attenuation for the lower frequencies.

11. A system of the character described for detecting radiation comprising means for converting radiation into impulses whose shape and magnitude correspond to the radiation, and anticipator fed by said converting means for discriminating against the impulses of lower frequency, a relaxation oscillator for producing signals, said anticipator being coupled to said oscillator for changing the constants of its output circuit to alter its frequency in response to said impulses, means for reproducing said signals, and an attenuator responsive to said signals for offering greater attenuation to the signals of lower frequency.

HUGH G. NEIL.

REFERENCES CITED

The following references are of record in the file of this patent:

UNITED STATES PATENTS

| Number | Name | Date |
|---|---|---|
| 2,416,702 | Krasnow | Mar. 4, 1947 |
| 2,434,297 | Test et al. | Jan. 13, 1948 |